No. 767,588. Patented August 16, 1904.

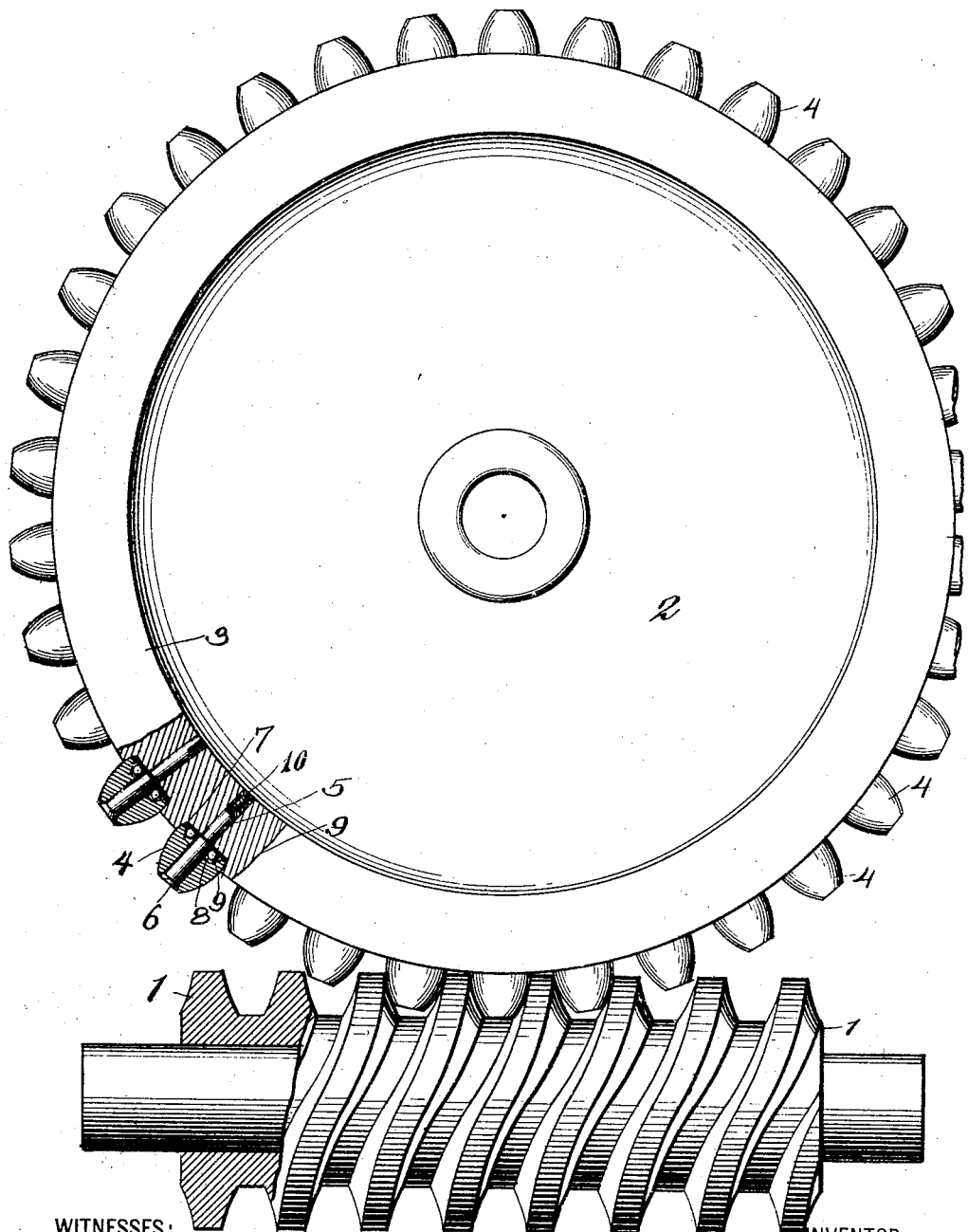

UNITED STATES PATENT OFFICE.

JOHN W. MOAKLER, OF NEW YORK, N. Y.

WORM-GEARING.

SPECIFICATION forming part of Letters Patent No. 767,588, dated August 16, 1904.

Application filed September 8, 1903. Serial No. 172,278. (No model.)

*To all whom it may concern:*

Be it known that I, JOHN W. MOAKLER, a citizen of the United States, residing in the borough of Manhattan, city, county, and State of New York, have invented certain new and useful Improvements in Worm-Gearing; and I do hereby declare the following to be a full, clear, and exact description of the invention, such as will enable others skilled in the art to which it appertains to make and use the same.

My invention relates to improvements in worm-gearing; and it consists in a novel construction comprising teeth having friction-rollers and a novel antifriction-bearing for said rollers.

The objects of my invention are to obtain increased efficiency and to reduce frictional losses in worm-gearing and to provide worm-gearing accomplishing the above objects which is nevertheless strong, simple, free from liability to derangement, and relatively inexpensive.

I will now proceed to describe my invention with reference to the accompanying drawing, showing a side view and partial section of a worm and worm-wheel in mesh, the worm-wheel being constructed in accordance with my invention.

The worm 1 (illustrated in the said drawing) is of substantially ordinary construction. It is double-threaded. The worm-wheel 2 comprises a base-wheel 3, having teeth formed by friction-rollers 4, held in place by pins 5, inserted in suitable openings in the periphery of the base-wheel. In the drawing one of these friction-rollers is shown in longitudinal section. The sectional outline of such roller is the sectional outline of an ordinary gear-tooth. The pins 5 are provided with heads 6 to hold the friction-rollers in place, and to assist said pins in resisting thrust on the teeth the bases 7 of the rollers enter suitably-formed circular recesses in the face of the base-wheel. The pressure of the worm upon the friction-rollers therefore causes said rollers to press against the sides of the said recesses in the base-wheel as bearings, and hence the strength of the tooth is substantially the same as if it were solid and stationary, while the friction of the gearing is very much less, since it is rotary instead of sliding friction.

To reduce the friction of the rollers 4 during their rotation to a low limit, I preferably provide said rollers with ball-bearings. For this purpose each roller is provided at its inner end with a flange beveled on the inside, the recess inclosed thereby forming a ball-pocket, and in said recess are placed bearing-balls 9. The sides of the recess 8 and the pins 5 and bottoms of the recesses in the base-wheel form the races.

The pins 5 are slightly tapered. To retain them in place, their inner ends are preferably split, and screws 10, screwing into the inner ends of said pins, serve to expand said ends, so as to clamp the pins in place.

In the operation of this gearing the friction-rollers 4 rotate during their period of contact with the teeth of the worm, thereby greatly reducing the friction.

It is obvious that my invention is not restricted to worm-wheels and that racks intended to coact with worms or other spiral gears may have teeth formed as above described, also that gear-wheels intermeshing with spiral gears may have such teeth. I intend the word "gear" as used hereinafter in the claims to include both gear-wheels and racks and intend the words "spiral gears" as used hereinafter in the claims to include what are commonly termed "spiral" gears in which the teeth do not form complete helices and worms in which the teeth do form helices.

It is obvious that my invention is susceptible of many variations and modifications in construction and arrangement of the parts, and I do not limit myself to the particular details of construction herein illustrated and described.

What I claim is—

1. In a gear, the combination with a suitable base having peripheral recesses corresponding to the several teeth, of teeth comprising bearing-pins projecting from said base and friction-rollers mounted thereon and set into said recesses and arranged to bear against the sides thereof and means for holding the rollers in place.

2. In a gear, the combination with a suitable base having peripheral recesses corresponding to the several teeth, of teeth comprising bearing-pins projecting from said base and friction-rollers mounted thereon and set into said recesses and arranged to bear against the sides thereof, said rollers having ball-races formed in their bases, and means for holding said rollers in place.

3. In a gear, the combination with a suitable base having peripheral recesses corresponding to the several teeth, of teeth comprising friction-rollers set into said recesses, said rollers having at their inner ends flanges inclosing recesses forming ball-pockets, and means for holding the rollers in place.

4. In a gear, the combination with a suitable base having peripheral recesses corresponding to the several teeth, of teeth comprising friction-rollers set into said recesses, said rollers having at their inner ends flanges inclosing recesses forming ball-pockets, pins projecting from said base, on which said rollers are mounted, and bearing-balls inclosed within said pockets.

5. In a gear, the combination with a suitable base having peripheral recesses corresponding to the several teeth, of teeth comprising friction-rollers set into said recesses, said rollers having at their inner end flanges beveled on the inside, inclosing recesses forming ball-pockets, pins projecting from said base, on which said rollers are mounted, and bearing-balls inclosed within said pockets and bearing against the beveled sides of said flanges, the pins, and the bottoms of the recesses in the base.

In testimony whereof I affix my signature in the presence of two witnesses.

JOHN W. MOAKLER.

Witnesses:
H. M. MARBLE,
C. F. CARRINGTON.